United States Patent
Choi et al.

(10) Patent No.: US 11,975,997 B2
(45) Date of Patent: May 7, 2024

(54) MULTI-COMPOSITION GLASS STRUCTURES VIA 3D PRINTING

(71) Applicant: CORNING INCORPORATED, Corning, NY (US)

(72) Inventors: Soon-yong Choi, Guri-si (KR); EunHwa Kim, Cheonan-si (KR); Hyung Soo Moon, Seoul (KR)

(73) Assignee: CORNING INCORPORATED, Corning, NY (US)

( * ) Notice: Subject to any disclaimer, the term of this patent is extended or adjusted under 35 U.S.C. 154(b) by 182 days.

(21) Appl. No.: 17/215,240

(22) Filed: Mar. 29, 2021

(65) Prior Publication Data

US 2021/0300809 A1    Sep. 30, 2021

Related U.S. Application Data

(60) Provisional application No. 63/003,045, filed on Mar. 31, 2020.

(51) Int. Cl.
*C03B 19/01* (2006.01)
*C03C 3/087* (2006.01)
(Continued)

(52) U.S. Cl.
CPC .............. *C03B 19/01* (2013.01); *C03C 3/087* (2013.01); *C04B 35/634* (2013.01); *C04B 41/0072* (2013.01); *C04B 2235/60* (2013.01)

(58) Field of Classification Search
CPC .......... C03B 19/01; C03B 19/06; B28B 1/001
See application file for complete search history.

(56) References Cited

U.S. PATENT DOCUMENTS

| 8,789,390 B2* | 7/2014 | Thomas | C03B 19/1453 |
| | | | 65/17.3 |
| 8,991,211 B1* | 3/2015 | Arlotti | C03B 19/06 |
| | | | 65/17.3 |

(Continued)

FOREIGN PATENT DOCUMENTS

| CN | 108602727 A | 9/2018 |
| CN | 109071318 A | 12/2018 |

(Continued)

OTHER PUBLICATIONS

Chinese Patent Application No. 202110335963.7, Office Action dated Mar. 4, 2024, 9 pages (English Translation only), Chinese Patent Office.

*Primary Examiner* — Erin Snelting
(74) *Attorney, Agent, or Firm* — Daniel J. Greenhalgh

(57) ABSTRACT

A method of producing a glass structure includes forming a green body having an inner layer of a first powder of a first glass composition in a first organic material matrix and an outer layer of a second powder of a second glass composition in a second organic material matrix, the outer layer covering at least two opposing major surfaces or all surfaces of the inner layer, the first glass composition being different from the second glass composition, the first and second powders having respective first and second sintering temperatures, the second sintering temperature being within 0 to 30° C. of the first sintering temperature; and debinding and sintering the green body to remove the organic materials and to sinter together the first and second glass powders to produce a sintered glass structure having an inner layer of the first glass composition and an outer layer of the second glass composition.

19 Claims, 5 Drawing Sheets

(51) Int. Cl.
*C04B 35/634* (2006.01)
*C04B 41/00* (2006.01)

(56) References Cited

U.S. PATENT DOCUMENTS

| | | | |
|---|---|---|---|
| 9,859,477 B2* | 1/2018 | Hawtof | H01L 33/505 |
| 10,399,304 B2 | 9/2019 | Cleary et al. | |
| 2009/0061178 A1 | 3/2009 | Sugimoto | |
| 2014/0044824 A1* | 2/2014 | Rohner | B33Y 30/00 |
| | | | 425/174.4 |
| 2015/0299036 A1 | 10/2015 | Ukrainczyk | |
| 2017/0029312 A1 | 2/2017 | Hummel et al. | |
| 2018/0009696 A1 | 1/2018 | Kim | |
| 2018/0127296 A1* | 5/2018 | Southard | C03C 8/02 |
| 2018/0272608 A1 | 9/2018 | Yun | |
| 2018/0354860 A1 | 12/2018 | Wang et al. | |
| 2019/0070748 A1* | 3/2019 | Comte | C03B 19/06 |
| 2019/0160741 A1* | 5/2019 | Weaver | B22F 12/45 |
| 2020/0017414 A1* | 1/2020 | Yen | B29C 64/124 |
| 2020/0024465 A1* | 1/2020 | Dylla-Spears | C09D 1/00 |
| 2020/0140318 A1* | 5/2020 | Fujino | C03C 3/06 |
| 2022/0009124 A1* | 1/2022 | Xiao | B33Y 40/20 |
| 2022/0080617 A1* | 3/2022 | Birol | B33Y 80/00 |
| 2022/0143908 A1* | 5/2022 | Jeandel | C03B 19/01 |
| 2022/0235194 A1* | 7/2022 | Peled | C03C 8/16 |
| 2023/0143241 A1 | 5/2023 | Boek et al. | |

FOREIGN PATENT DOCUMENTS

| | | | |
|---|---|---|---|
| KR | 10-1926578 B1 | 12/2018 | |
| WO | 2008/132913 A1 | 11/2008 | |
| WO | 2016/048341 A1 | 3/2016 | |
| WO | 2017/192797 A1 | 11/2017 | |
| WO | WO-2017192794 A1 * | 11/2017 | B32B 17/06 |
| WO | WO-2018013506 A1 * | 1/2018 | B32B 17/06 |

* cited by examiner

MULTI-COMPOSITION GLASS STRUCTURES VIA 3D PRINTING

This application claims the benefit of priority under 35 U.S.C. § 119 of U.S. Provisional Application Ser. No. 63/003,045, filed on Mar. 31, 2020, the content of which is relied upon and incorporated herein by reference in its entirety.

FIELD OF THE DISCLOSURE

The disclosure relates to methods for 3D printing of glass structures comprising multiple glass compositions, and more particularly to methods for 3D printing of glass structures comprising multiple glass compositions producing structures having enhanced strength and/or damage resistance.

BACKGROUND 3D printing, in most of its forms, is a technology to additively produce a structure by the build-up or lamination of 2D printed layers of material. This technology was initially used for mock-ups and/or testing in early stage product development, to verify product appearance or to detect any problems in final product design before mass production. In recent years, 3D printing has begun to find expanded application in various fields partly because it can produce a structure directly, based only on digital structural information such as CAD drawings. In particular, 3D printers have been successfully used to produce precision parts and high strength ceramic parts.

3D printing of glass structures has been explored using various methods, including direct deposition from a glass melt, fused filament fabrication (FFF) with a glass filament, and extrusion of viscous glass from a heated head fed by a glass rod under load. These methods form glass structures directly from a glass melt or a filament or rod of glass. In other exploration, polymer-based 3D forming techniques, such as SLA (stereolithography), digital light production (DLP) or other forms of resin printing and fused filament fabrication (FFF) have been adapted to use glass-filled polymer materials. These methods require the additional steps of debinding (removing the polymer from) the solidified polymer-glass matrix (typically by heating) and sintered the debinded structure to densify and consolidate the glass.

Chemical strengthening (ion exchange) has been previously suggested for strengthening 3D printed glass structures. It would be useful to provide an additional, potentially simpler strengthening method.

SUMMARY OF THE DISCLOSURE

According to aspects of the present disclosure, a method of producing a glass structure is provided, the method including or comprising, firstly, forming a green body, the green body including or comprising (a) an inner layer consisting of a first powder of a first glass composition in a first organic material matrix and (b) an outer layer consisting of a second powder of a second glass composition in a second organic material matrix, the outer layer covering the inner layer (i) on at least two opposing major surfaces of the inner layer, or (ii) on all surfaces of the inner layer, the first glass composition being different from the second glass composition, the first powder having a first sintering temperature, the second powder having a second sintering temperature, and the second sintering temperature being within the range of from 0 to 30° C. from the first sintering temperature. The method secondly includes or comprises debinding and sintering the green body to remove the first and second organic material matrixes and to sinter together the first glass powder and the second glass powder to produce a sintered glass structure having an inner layer of the first glass composition and an outer layer of the second glass composition.

Particularly when forming glass structures having fine features, the second sintering temperature can be within the range of from 0 to 20° C. from the first sintering temperature, or even within the range of from 0 to 10° C. from the first sintering temperature.

To provide increased strength and/or damage resistance, the first glass composition has a first coefficient of thermal expansion (CTE), the second glass composition has a second CTE, the first CTE is greater than the second CTE by a value within the range of from $5 \times 10^{-7}$ to $15 \times 10^{-7}$/° K. Alternatively the first CTE can be greater than the second CTE by a value within the range of from $5 \times 10^{-7}$ to $12 \times 10^{-7}$/° K, or even within the range of from $5 \times 10^{-7}$ to $9 \times 10^{-7}$/° K.

In one alternative embodiment, the inner layer has two opposing major surfaces, and the outer layer covers at least the two opposing major surfaces of the inner layer. In another alternative embodiment, the outer layer covers the inner layer, on all surfaces of the inner layer.

According to embodiments, the forming of the green body comprises or includes 3D printing. The 3D printing may be in the form of stereolithography or digital light projection, or even fused filament fabrication or other methods.

The sintering can comprise or include sintering together the first glass powder and the second glass powder until a sintered glass structure is produced having an inner layer of the first glass composition and an outer layer of the second glass composition and no open porosity.

The organic material matrix the second organic material matrix can be the same to within industrial tolerances, such as having the same composition to within 1% or less of each ingredient by weight, or they may be different, such as having different compositions of at least of one or more ingredients by 1 weight percent.

The inner layer can have a first powder loading by volume percent and the outer layer can have a second powder loading by volume percent with the first powder loading and the second powder loading are different by at least 1 volume percent, or the powder loadings may be the same to within typical industrial tolerances.

The methods of the present disclosure produce improved mechanical properties such as strength and damage resistance through the CTE mismatched structure proposed in and produced according to this disclosure. Thus polymer matrix forming such as 3D printing using glass materials can both create precise and complex products and result in improved mechanical properties, all without additional strengthening processes.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
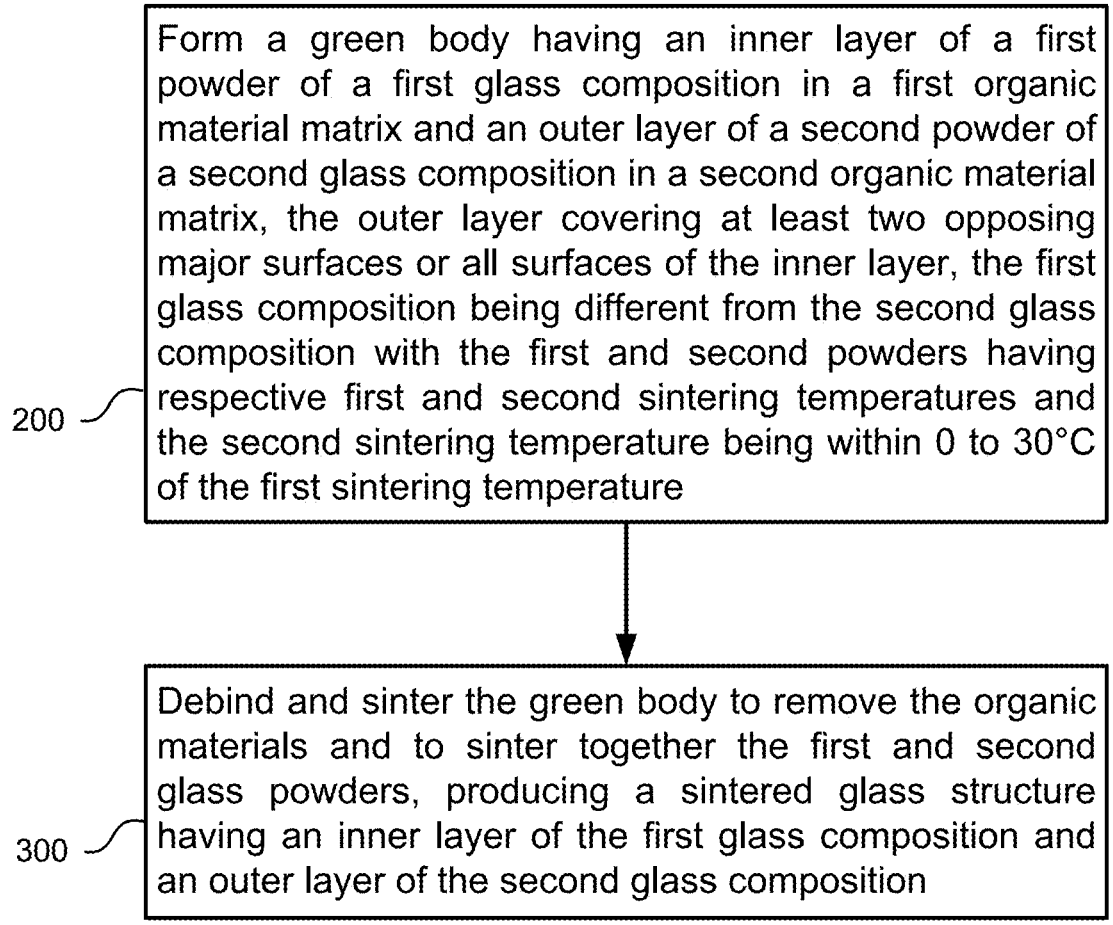
FIG. 1 is flow diagram illustrating steps embodiments of the present disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
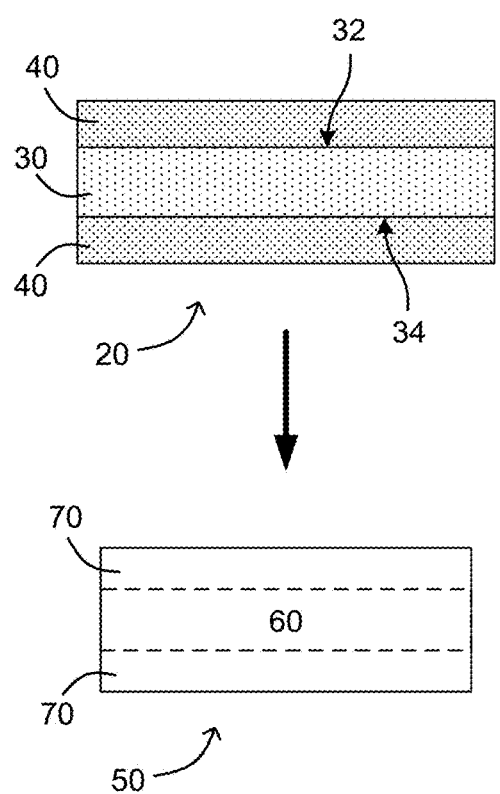
FIGS. 2 and 3 are cross-sectional diagrammatic representations of a green body formed and then debinded and sintered to produce a glass body, according to embodiments of this disclosure.
Figure 3:
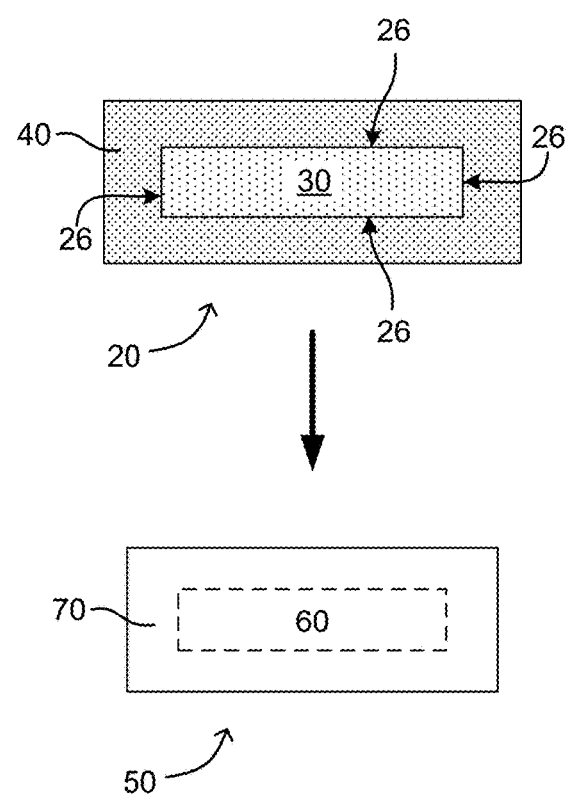

As illustrated in the flow chart of FIG. 1 and in the cross-sections of FIG. 2 FIG. 3, a method of producing a glass structure is provided, the method including or comprising forming a green body 20 (step 200 of FIG. 1), the green body 20 including or comprising (a) an inner layer 30 consisting of a first powder of a first glass composition in a first organic material matrix and (b) an outer layer 40 consisting of a second powder of a second glass composition in a second organic material matrix. The outer layer 40 covers the inner layer 30 (i) on at least two opposing major surfaces 32, 34 of the inner layer 30 as in FIG. 2, or (ii) on all surfaces 36 of the inner layer 30 as in FIG. 3. The first glass composition is different from the second glass composition with the first powder having a first sintering temperature, and the second powder having a second sintering temperature and the second sintering temperature being within the range of from 0 to 30° C. from the first sintering temperature. The method also includes debinding and sintering the green body 20 (step 300 of FIG. 1) to remove the first and second organic material matrixes and to sinter together the first glass powder and the second glass powder to produce a sintered glass structure 50 having an inner layer 60 of the first glass composition and an outer layer 70 of the second glass composition as shown in FIGS. 2 and 3.

It is desirable in some cases, such as for the creation of structures having small-dimensioned features, that the second sintering temperature is within the range of from 0 to 20° C. from the first sintering temperature, or even within the range of from 0 to 10° C. from the first sintering temperature. For desirable increases in strength and/or damage resistance, the the first glass composition has a first coefficient of thermal expansion (CTE), the second glass composition has a second CTE, and the first CTE is greater than the second CTE by a value within the range of from $5 \times 10^{-7}$ to $15 \times 10^{-7}/°$ K, or within the range of from $5 \times 10^{-7}$ to $12 \times 10^{-7}/°$ K, or even within a range of from $5 \times 10^{-7}$ to $9 \times 10^{-7}/°$ K.

In one embodiment represented in the cross sections of FIG. 2, the inner layer 30 has two opposing major surfaces 32, 34, and the outer layer 40 covers at least the two opposing major surfaces 32, 34 of the inner layer 30. In another embodiment represented in the cross sections of FIG. 3, outer layer 40 covers the inner layer 30 on all surfaces 26 of the inner layer 30.

Forming the green body 20 desirably is performed, at least in part, by 3D printing the green body 20. Such 3D printing can include stereolithography (SLA), or digital light projection (DLP), and other forms of photopolymerization. Another alternative is fused filament fabrication (FFF) using glass-powder-filled polymer filaments.

As may be appreciated from the figures, most 3D printing methods may be quite easily adapted to form the embodiment of FIG. 2 above and variations thereof. All that is generally required is a change of the feedstock or filament when needed to switch between materials, ro programmed of nozzle/head for machines capable of simultaneous handling of multiple materials. With DLP and similar techniques, change of the filled polymerization fluid which of course may involve additional steps of cleaning the already formed (initially polymerized) inner layer 30 to remove unpolymerized material and cleaning the polymerization tray and exposure surface and filling with the next polymerization material.

Embodiments in which outer layer 40 covers the inner layer 30 on all surfaces 26 of the inner layer 30 require 3D printing processes that can produce structures of two materials with one material enclosing the other. Examples such processes as FFF with two different filament materials, SLA with two different pre-polymerization liquids and with exposure radiation source(s) that can irradiate from multiple directions, and other multi-material 3D printing techniques, for example, such that recently disclosed in US20180272608.

Figure 4:
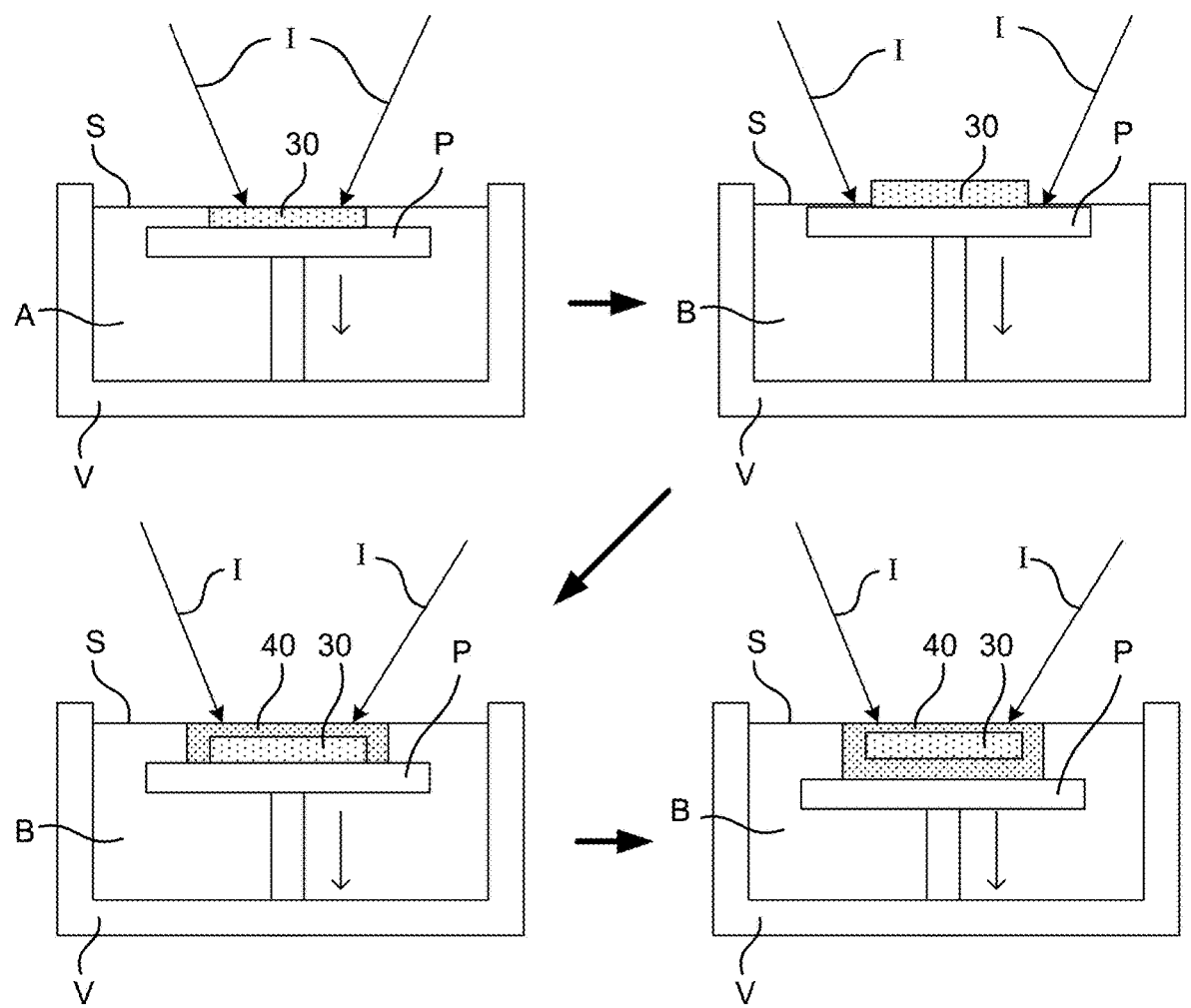
FIG. 4 is sequential diagrammatic cross section of one embodiment of a process useful to form a green body of the type shown in FIG. 3.

FIG. 4 shows, in a sequential diagrammatic cross section, an example of a process using SLA to form a green body 20 of the type shown in FIG. 3 above. First, as represented at the top left of the figure, irradiation I is used to polymerize, at and near the surface S, a first glass-loaded monomer A held in a vat V to form the inner layer 30 of the eventual green body. As the polymerization proceeds, the build platform P moves downward as indicated, allowing buildup of the inner layer 30. Second, as illustrated at the top right of the figure, after the inner layer 30 is at finished size, inner layer 30 is positioned on a build platform P (the same or a different platform) with a second glass-loaded monomer B in the vat V (using a second glass composition). The irradiation I is used to polymerize the second monomer B to build up portions of the outer layer 40 beside the inner layer 30 on the platform P and above the inner layer opposite the platform P as shown at the bottom left of the figure. Once the desired thickness of outer layer 40 is reached in the configuration shown at the bottom left, then the partially formed green body is removed from and replaced on the platform P in inverted orientation to allow the buildup of the remaining side of outer layer 40, as shown at the bottom right.

Sintering, in embodiments, comprises or includes sintering together the first glass powder and the second glass powder until a sintered glass structure is produced having an inner layer of the first glass composition and an outer layer of the second glass composition and no open porosity. Transparency is also desirable for some applications and can be achieved.

The first organic material matrix and the second organic material matrix may have the same composition, to within normal industrial tolerances, or may have different compositions. Specifically, the first organic material matrix and the second organic material matrix can have the same composition to within 1% or less of each ingredient by weight, or the first organic material matrix and the second organic material matrix can have different compositions of at least one or more ingredients by 1 weight percent. In the case thermal debinding is used, which is preferred for its convenience, both organic matrixes, whether the same or different, are chosen from those that have a debinding temperature less than the sintering temperatures of the two glass materials.

The powder loading of the inner and outer layers may also be the same, to within normal industrial tolerances, or different. Specifically, the inner layer can have a first powder loading by volume percent and the outer layer can have a second powder loading by volume percent different by at least 1 volume percent, or different by less than 1 volume percent.

Experimental

To demonstrate present concepts and test the performance of a particular 3D printed multi-composition glass structure, Corning glasses codes 2319 and 2320 were selected for the first and second glass compositions, respectively. Selected physical properties of these two glass compositions are shown in Table I below.

TABLE I

| | Glass Composition | |
| --- | --- | --- |
| Property | 2319 | 2320 |
| Softening Point | 895° C. | 900° C. |
| Strain Point | 653° C. | 628° C. |
| Annealing Point | 599° C. | 574° C. |
| Thermal Expansion Coefficient (CTE) | $81.4 \times 10^{-7}/°$ C. | $75.8 \times 10^{-7}/°$ C. |
| Density | 2.42 g/cm$^3$ | 2.39 g/cm$^3$ |
| Young's Modulus | 71.5 GPa | 69.3 GPa |

Nominal chemical composition is shown in Table II below.

TABLE II

| Components, | Glass Composition | |
|---|---|---|
| in mol % | 2319 | 2320 |
| $SiO_2$ | 68.96 | 67.55 |
| $B_2O_3$ | 0 | 3.67 |
| $Al_2O_3$ | 10.28 | 12.67 |
| $Na_2O$ | 15.21 | 13.66 |
| $K_2O$ | 0.012 | 0.014 |
| MgO | 5.37 | 2.33 |
| CaO | 0 | 0 |
| $Fe_2O_3$ | 0 | 0.008 |
| $ZrO_2$ | 0 | 0.005 |
| $SnO_2$ | 0.17 | 0.10 |

To produce the green body, photopolymerizable fluids/pastes where created according to the recipes shown below in Table III.

TABLE III

| Ingredients | Glass Composition | |
|---|---|---|
| (by wt %) | 2319 | 2320 |
| Mono/polymer | 8.68 | 8.71 |
| Dispersant | 6.52 | 6.58 |
| Modifiers | 13.92 | 13.98 |
| Photoinitiator | 0.97 | 0.75 |
| Filler (glass powder) | 69.91 | 69.63 |
| Color agent | — | 0.35 |
| Total | 100 | 100 |

Figure 5:
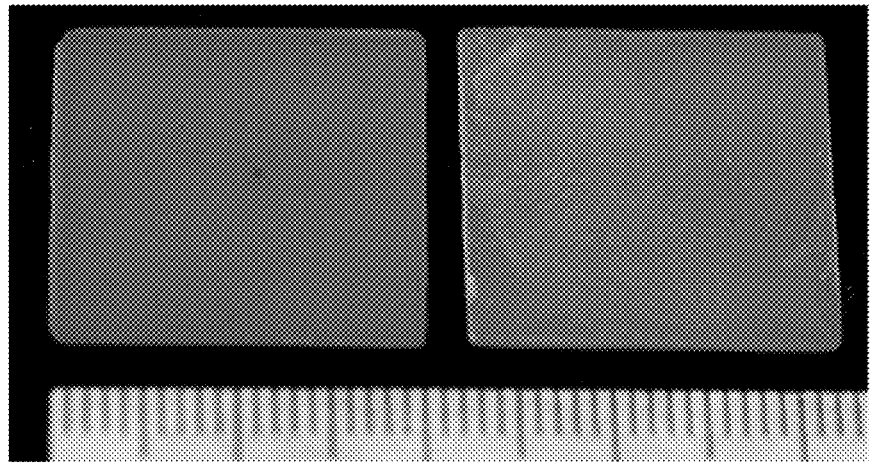
FIG. 5 is a digital photograph of 3d printed green bodies according to an embodiment of the present disclosure.
Figure 6:
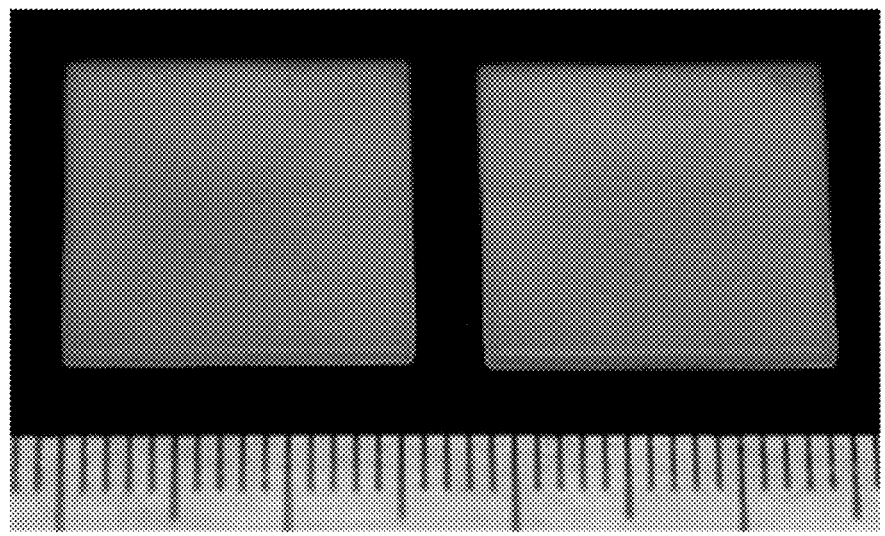
FIG. 6 is a digital photograph of glass structures produced after sintering of the 3d printed green bodies of FIG. 5, according to an embodiment of the present disclosure.

To distinguish between layers, 0.35 wt. % of chromium (III) nitrate was added to the 2320 paste to produce a green color. The pastes were produced by 48 hours of mixing (using IKA RW-20 stirrer). For 3D printing, a DLP printer, Carima model IM-2 available from Carima Co., Ltd., of Seoul, Korea, was used. In a structure like that of FIG. 2 above, all layers for test and demonstration were printed at a thickness of 50 micrometers, Green body samples of 4 cm width (pre-sintering) are shown in the digital photograph of FIG. 5. De-binding was performed at 550° C. for 48 hours, and sintering at 820° C. and $10^{-5}$ torr, for 9 hrs. The same samples after sintering, now in the form of glass structures, are shown in the digital images of FIG. 6.

Mechanical testing samples of the same thickness and width and length of 1 cm were printed and fired as above. 2319, as the higher CTE glass composition, is of course the inner layer 30 (with the 2020 paste comprising the outer layer 40, or in other words the top and bottom layers of a three-layer stack). As controls for comparison, a two homogeneous green bodies of 150 micrometers thickness were printed, one for each glass composition.

Figure 7:
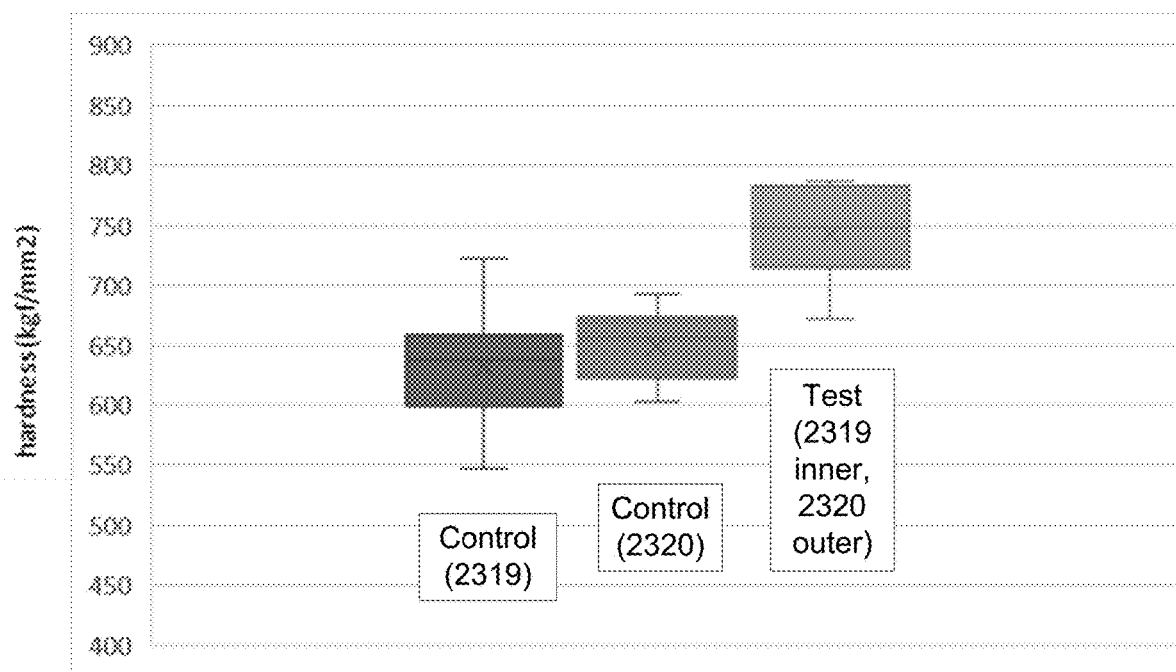
FIG. 7 is a graph of Vickers indentation test results of two types of control samples and of a glass structure according to and embodiment of the present disclosure.

To evaluate mechanical properties, the Vicker's hardness of homogeneous control structures and the test samples with different inner and outer glass layers were measured on the ASTM C1327-15 indentation test. Test results shown in the graph of FIG. 7 and in Table IV below demonstrated a 14-17% increase in hardness value compared to single layer structure of a single composition when forming the CTE-mismatched 3 layer structure.

| Sample | Mean (kgf/mm$^2$) | SD |
|---|---|---|
| Control: single layer (2319) | 649.1 | 57.9 |
| Control: single layer (2320) | 631.2 | 39.1 |
| Test: 2319 inner, 2320 outer | 742.4 | 60.7 |

These results verify the effects of increased mechanical properties through the CTE mismatched structure proposed in and produced according to this disclosure. Thus 3D printing using glass materials can be used to create precise and complex products with good mechanical properties, without additional strengthening processes.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method of producing a glass structure, the method comprising:
   (1) forming a green body comprising (a) an inner layer consisting of a first powder of a first glass composition in a first organic material matrix and (b) an outer layer consisting of a second powder of a second glass composition in a second organic material matrix, the outer layer covering the inner layer (i) on at least two opposing major surfaces of the inner layer, or (ii) on all surfaces of the inner layer, the first glass composition being different from the second glass composition, the first powder having a first sintering temperature, the second powder having a second sintering temperature, and the second sintering temperature being within the range of from 0 to 30° C. from the first sintering temperature;
   (2) debinding and sintering the green body to remove the first and second organic material matrixes and to sinter together the first glass powder and the second glass powder to produce a sintered glass structure having an inner layer of the first glass composition and an outer layer of the second glass composition,
   wherein forming the green body comprises photopolymerizing the first organic material matrix and the second organic material matrix, and
   wherein the first organic material matrix and the second organic material matrix have the same composition to within 1% or less of each ingredient by weight.

2. The method according to claim 1 wherein the second sintering temperature is within the range of from 0 to 20° C. from the first sintering temperature.

3. The method according to claim 1 wherein the second sintering temperature is within the range of from 0 to 10° C. from the first sintering temperature.

4. The method according to claim 1, wherein the first glass composition has a first coefficient of thermal expansion (CTE), the second glass composition has a second CTE, the first CTE is greater than the second CTE by a value within the range of from $5\times10^{-7}$ to $15\times10^{-7}$/° K.

5. The method according to claim 1, wherein the first glass composition has a first coefficient of thermal expansion (CTE), the second glass composition has a second CTE, the first CTE is greater than the second CTE by a value within the range of from $5\times10^{-7}$ to $12\times10^{-7}/°$ K.

6. The method according to claim 1, wherein the first glass composition has a first coefficient of thermal expansion (CTE), the second glass composition has a second CTE, the first CTE is greater than the second CTE by a value within the range of from $5\times10^{-7}$ to $9\times10^{-7}/°$ K.

7. The method according to claim 1 wherein the outer layer covers only the at least the two opposing major surfaces of the inner layer.

8. The method according to claim 1 wherein the outer layer covers all the surfaces of the inner layer.

9. The method according to claim 1 wherein forming comprises stereolithography or digital light projection.

10. The method according to claim 1 wherein sintering comprises sintering together the first glass powder and the second glass powder until the sintered glass structure is produced having the inner layer of the first glass composition and the outer layer of the second glass composition and no open porosity.

11. The method according to claim 1 wherein the inner layer has a first powder loading by volume percent and the outer layer has a second powder loading by volume percent and the first powder loading and the second powder loading are different by at least 1 volume percent.

12. A method of producing a glass structure, the method comprising:
   (1) forming a green body comprising (a) an inner layer consisting of a first powder of a first glass composition in a first organic material matrix and (b) an outer layer consisting of a second powder of a second glass composition in a second organic material matrix, the outer layer covering the inner layer (i) on at least two opposing major surfaces of the inner layer, or (ii) on all surfaces of the inner layer, the first glass composition being different from the second glass composition, the first powder having a first sintering temperature, the second powder having a second sintering temperature, and the second sintering temperature being within the range of from 0 to 30° C. from the first sintering temperature;
   (2) debinding and sintering the green body to remove the first and second organic material matrixes and to sinter together the first glass powder and the second glass powder to produce a sintered glass structure having an inner layer of the first glass composition and an outer layer of the second glass composition,
   wherein forming the green body comprises photopolymerizing the first organic material matrix and the second organic material matrix, and
   wherein the first organic material matrix and the second organic material matrix have different compositions of one or more ingredients by at least 1 weight percent.

13. The method according to claim 12 wherein the second sintering temperature is within the range of from 0 to 20° C. from the first sintering temperature.

14. The method according to claim 12, wherein the first glass composition has a first coefficient of thermal expansion (CTE), the second glass composition has a second CTE, the first CTE is greater than the second CTE by a value within the range of from $5\times10^{-7}$ to $15\times10^{-7}/°$ K.

15. The method according to claim 12 wherein the outer layer covers only the at least the two opposing major surfaces of the inner layer.

16. The method according to claim 12 wherein the outer layer covers all the surfaces of the inner layer.

17. The method according to claim 12 wherein forming comprises stereo lithography or digital light projection.

18. The method according to claim 12 wherein sintering comprises sintering together the first glass powder and the second glass powder until the sintered glass structure is produced having the inner layer of the first glass composition and the outer layer of the second glass composition and no open porosity.

19. The method according to claim 12 wherein the inner layer has a first powder loading by volume percent and the outer layer has a second powder loading by volume percent and the first powder loading and the second powder loading are different by at least 1 volume percent.

\* \* \* \* \*